Dec. 6, 1966 R. D. STANDRIDGE 3,289,298
CALIBRATION APPARATUS FOR SURFACE PLATES
Filed June 1, 1964 2 Sheets-Sheet 1
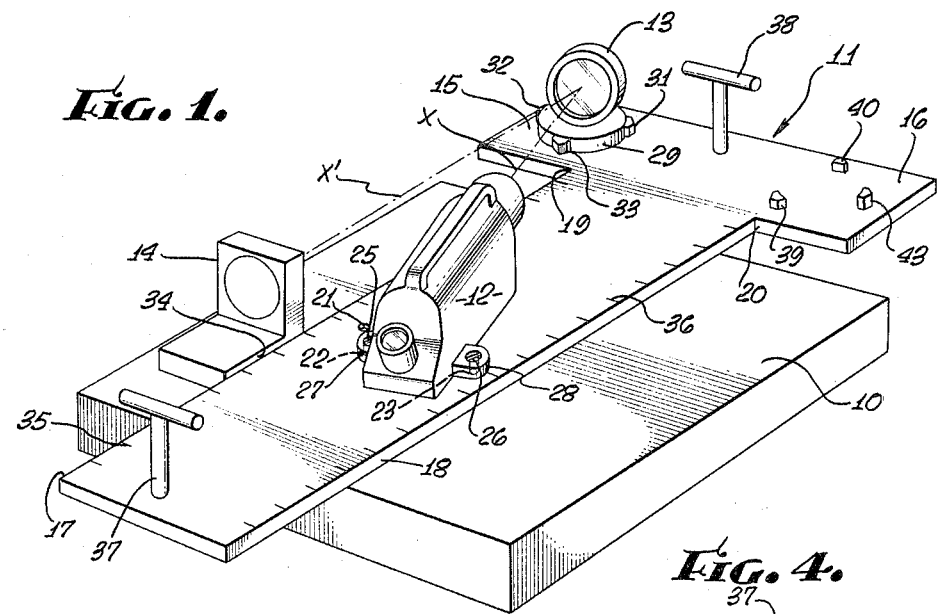
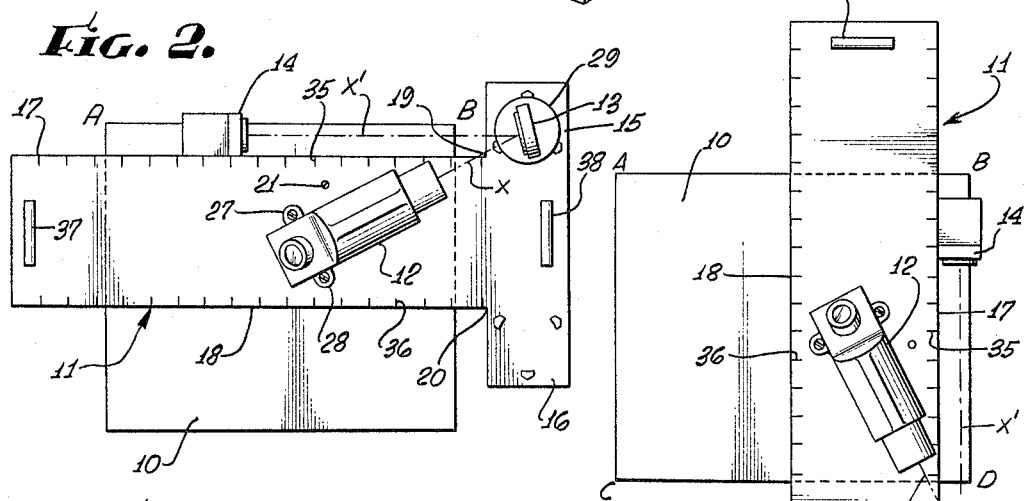
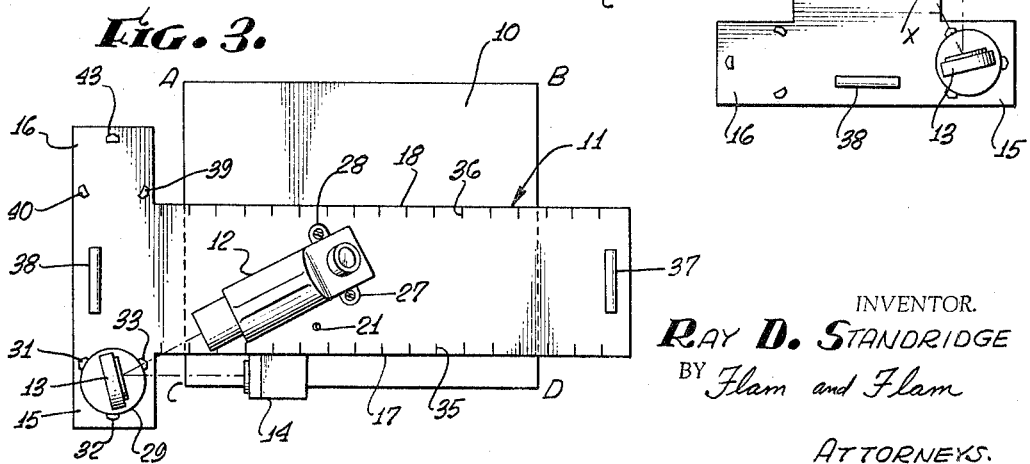
INVENTOR.
RAY D. STANDRIDGE
BY Flam and Flam
ATTORNEYS.

Dec. 6, 1966  R. D. STANDRIDGE  3,289,298
CALIBRATION APPARATUS FOR SURFACE PLATES
Filed June 1, 1964  2 Sheets-Sheet 2

INVENTOR.
RAY D. STANDRIDGE
BY Flam and Flam
ATTORNEYS.

United States Patent Office 3,289,298
Patented Dec. 6, 1966

3,289,298
CALIBRATION APPARATUS FOR SURFACE PLATES
Ray D. Standridge, Santa Fe Springs, Calif., assignor to Collins Microflat Company, Inc., Hawthorne, Calif., a corporation of California
Filed June 1, 1964, Ser. No. 371,300
4 Claims. (Cl. 33—1)

This invention relates to surface plates used, for example in testing laboratories.

Surface plates are sold together with calibration charts showing the deviation from flatness of the various areas of the plate (usually in millionths of an inch), so that the plate can be used for extremely accurate measurements. For a rectangular surface plate, the calibration chart is likewise rectangular, with eight lines: four boundary lines, two bisectors, and two diagonals. Along each line at spaced intervals are legends such as —30 meaning that at that point the surface is 30 millionths of an inch lower than the theoretical flat plane.

A typical calibration of a surface plate involves the use of an autocollimator, a mirror and a straight edge. The procedure is to place the straight edge along one of the eight calibration lines and then locate the autocollimator at one end of the line near the edge of the plate, and the mirror at the other end. The autocollimator is lined up with the mirror, and a number of readings are obtained as the mirror is positioned successively closer to the autocollimator, using the side of the straight edge as a guide. This procedure is fairly simple, but since the autocollimator occupies space, a reading cannot be obtained for the edge of the plate where the autocollimator is located. This can be corrected by shooting each line twice, that is, from both directions. The two readings must then be related. This is a rather time-consuming process.

Another method is to use two mirrors, and positioning the autocollimator off the plate and at a slight angle to the edge. The first mirror, located at the end of the line, is adjusted so that its angularity is half that of the autocollimator so that the autocollimator in effect shoots along the line of the edge. The second mirror is moved along the edge, and readings are obtained along the entire length of the line. While this method avoids the double shooting of each of the eight lines, there is no saving because it is extremely time consuming to set up the autocollimator and two mirrors for each of the eight lines.

The primary object of this invention is to provide apparatus capable of calibrating an entire surface plate in a small fraction of the time heretofore required. For this purpose, use is made of an angled support that is itself an optical-type flat, the support providing places for mounting the autocollimator and the first reflecting mirror, the support providing the straight edge along which the second mirror may be moved. The support is long enough so that the straight edge extends from edge to edge of the surface plate whereby the entire length of the calibration line is exposed. When one line is calibrated, the support together with the mirror and autocollimator is moved to another of the eight lines without disturbing the alignment of the first mirror and autocollimator. Thus the alignment procedure need not be repeated for each of the calibration lines.

Another object of this invention is to provide a compact device of this character that can be used in the field.

Another object of this invention is to provide a device of this character having a feature of versatility for use in situations where there are space limitations. For this purpose, the support provides alternate mounting of the autocollimator and first mirror for shooting along alternate edges of the support.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a pictorial view of apparatus incorporating the invention shown in use;

FIGS. 2 through 7 are diagrammatic view illustrating the manner in which the surface plate is calibrated.

Figure 5:
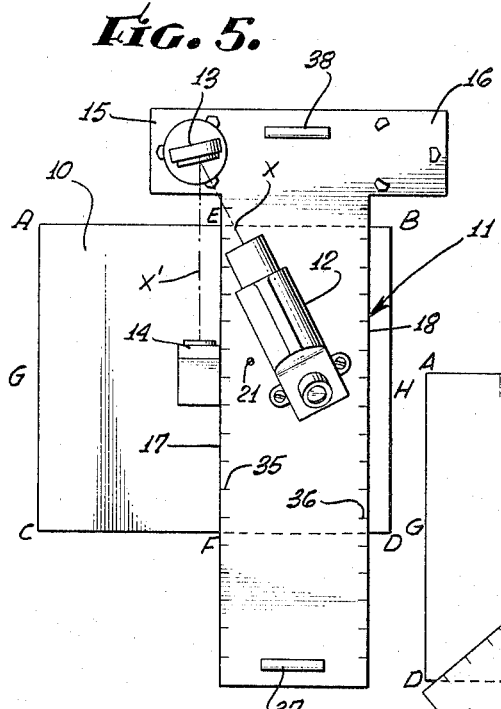
Figure 6:
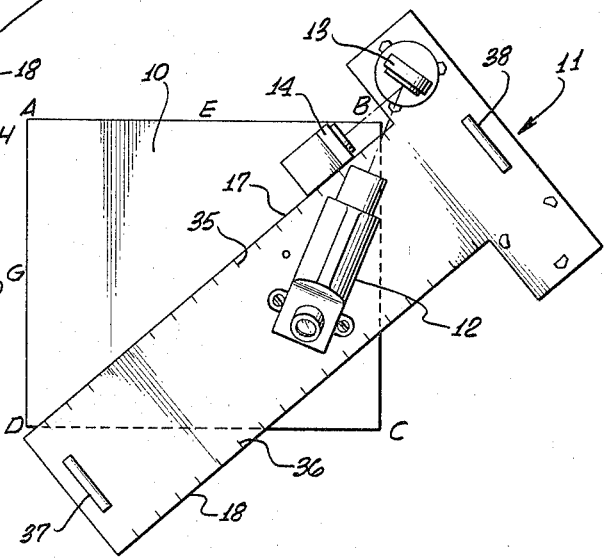
Figure 7:
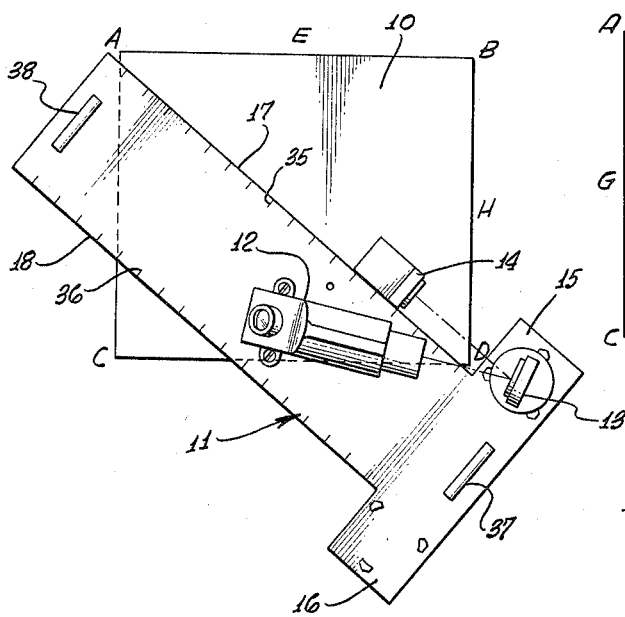
Figure 8:
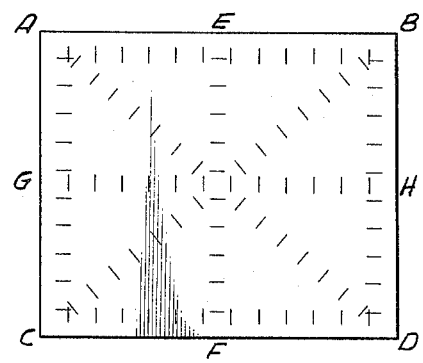
FIG. 8 is a calibration chart.

In FIG. 1 there is illustrated a granite or other surface plate 10 that has been ground and processed in order to provide flatness to within certain tolerances. In order for the user of the surface plate 10 to make accurate measurements, a calibration chart such as shown in FIG. 8 must be provided. This calibration chart comprises a series of eight lines, four along the edges (AB, CD, AC and BD), two bisectors (EF and GH), and two diagonals (AD and CB). At successive positions along each of the lines are legends indicating the deviation of the surface plate from the true flatness as for example in millionths of an inch.

By the aid of such a chart, and depending on the location of the work on the plate, the user can either directly utilize the readings on the chart or he may interpolate and thus approximate the surface deviation.

The calibration apparatus as shown in FIG. 1 includes a support 11, a collimator 12 resting upon the support 11, an alignment mirror 13 and a reflecting mirror 14. The collimator 12 and mirrors 13 and 14 are each of known design and construction. The support 11 is itself in the form of an optical flat having an under surface that substantially conforms to the operative upper surface of the surface plate 10. Preferably the support is made from a black granite. Other suitable material may be used.

The support is substantially in the shape of a T, there being projections 15 and 16 extending laterally in opposite directions at one end of the support. The support 11 has parallel flat side surfaces 17 and 18. These side surfaces extend from the respective corners 19 and 20 formed by the projections 15 and 16 to the opposite end of the support 11.

The support 11 is of such length that it may exceed the dimensions of the surface plate 10. Thus when the support 11 is placed on the plate 10, the projections 15 and 16 may be located beyond the edges of the plate 10 as shown in FIG. 1. The support 11 has a number of fixture elements in the form of recesses 21, 22 and 23. Two of these recesses register with screws 25 and 26 that pass through apertured ears 27 and 28 of the collimator 12 normally used for mounting purposes. Other fixture means are provided for locating the collimator 12. In the position shown, the ears 27 and 28 of the collimator are located above the center hole 22 and the right hole 23. When the screws 25 and 26 are dropped in the holes, the collimator has a particular angularity with respect to the center line of the support 11. The collimator may be moved so that it assumes the opposite angularity.

In the position illustrated, the collimator 12 is directed toward the projection 15. Resting upon the projection 15 is the alignment mirror 13. This mirror has a circular base 29 formed as a flat, and is located by fixture means in the form of three lugs 31, 32 and 33. These lugs cooperate with the circular base 27 to locate the mirror 13 while permitting its angular movement about an axis normal to the support.

By adjusting the angular position of the mirror base 29, and by adjusting the collimator 12, the collimator beam X may be caused to be reflected at X' so as to parallel the side edge 17 and the plane of the support. The adjustment is not disturbed even if the support 11 is moved on the plate 10. The reflecting mirror 14 is positioned on the plate 10 and intercepts the beam X' produced by the collimator. A line normal to the operative surface of the mirror is maintained in a vertical plane perpendicular to the support 11 by engagement of a flat side surface 34 with the support edge 17. But depending upon the flatness of the plate 10, the normal will deviate more or less from parallel relationship with the plane of the support 11. Accordingly the beam X' will be reflected up or down, the amount being measurable by the collimator 12.

In order to produce the line AB on the calibration chart shown in FIG. 8, the support 11 with the collimator 12 and alignment mirror 13 are positioned as illustrated in FIG. 2 with the edge 17 closely paralleling the edge of AB of the surface plate 10. The reflecting mirror 14 is first located at the corner 19 of the surface plate with its side surfaces in engagement with a straight edge 17. The reading is taken and noted and the reflecting mirror 14 moved in incremental amount rearwardly along the edge 17 and at positions indicated by a scale 35 attached to the upper surface of the support 11. A similar scale 36 is located adjacent the edge 18.

The mirror 14 can be moved all the way to the corner A of the surface plate 10. Thus the entire length of the line can be calibrated due to the overhanging relationship made possible by the support 11. When the line AB is calibrated the next line may be calibrated by moving the support 11 together with the collimator 12 and mirror 13 to the position illustrated in FIG. 3. During the course of such movement neither the collimator 12 nor the mirror 13 is moved relative to the support 11. The edge 17 is placed parallel to the edge CD of the surface plate 10. In order to assist the movement of the plate, two handles 37 and 38 are provided. These handles project upwardly from opposite ends of the surface plate 11 and may be attached in any suitable manner.

The calibration line CD is obtained without requiring readjustment of the collimator 12 or mirror 13. The support may then be moved to the positions of FIGS. 4, 5, 6, 7, etc. until all eight lines along the calibration chart shown in FIG. 8 are obtained.

Since the collimator 12, the edge 17, and the alignment mirror 13 are at all times carried by the support 11, no readjustment is required as the support is positioned along different lines. Accordingly calibration is accomplished quite rapidly.

In the event that there is inadequate access at certain edges of the surface plate, collimator 12 can be moved to an alternate position with the screws 25 and 26 engaging the holes 21 and 22 rather than the holes 22 and 23. The alignment mirror can then be moved to the opposite projection 16 which provides a space defined by lugs 39, 40 and 43 for reception of the mirror base 29. The scale 36 operates in conjunction with the side edge 18 and the operation is identical.

In the event that the surface plate is long, the apparatus can be positioned along a part of the line and then bodily moved rearwardly toward adjoining portions of the line of the calibration chart.

The inventor claims:

1. In apparatus for calibrating a surface plate: a support having substantially flat undersurface areas adapted to rest upon a surface plate, said support having a substantially flat side edge extending along the length thereof, said support having a part projecting beyond said side edge; a reflecting mirror resting on said surface plate and slidably engaging said side edge; an alignment mirror; means for locating said alignment mirror at said projecting part; a collimator; means for locating said collimator on said support in line with said locating means.

2. In apparatus for calibrating a surface plate: a support having substantially flat undersurface areas adapted to rest upon a surface plate, said support having a pair of substantially parallel flat side edges extending along the length thereof, said support having parts projecting beyond the side edges at one end of the support; a reflecting mirror resting on said surface plate and slidably engaging said side edge; an alignment mirror; first fixture means mounted by the parts for selectively locating said alignment mirror; a collimator; and second fixture means mounted on the support for locating said collimator in one of two alternate positions in line with the alignment mirror and in accordance with the selected alignment mirror position.

3. In apparatus for calibrating a surface plate: a support having a block T shape defined by an elongated part and two transversely extending parts; said elongated part having substantially parallel straight edges along opposite sides; a collimator type device; a fixture for locating said collimator type device on the elongated part in one of two alternate positions corresponding respectively to alignment with said transversely extending parts; a reflecting mirror resting on said surface plate and slidably engaging one of said straight edges; and an alignment mirror mounted on said surface plate for aligning the collimator sighting along said one of said straight edges with said reflecting mirror.

4. In apparatus for calibrating a surface plate: a support having substantially flat undersurface areas adapted to rest upon a surface plate, said support having a substantially flat side edge extending along the length thereof, said support having a part projecting beyond said side edge; a reflecting mirror slidably engaging said side edge; a collimator type device mounted on said support at an angle to said edge; and an alignment mirror mounted on said part for alignment of the collimator sighting along said edge in conjunction with said reflecting mirror.

References Cited by the Examiner

UNITED STATES PATENTS

| 1,328,871 | 1/1920 | Hahn | 33—1 |
| 2,471,009 | 5/1949 | Reason | 73—105 |
| 2,947,083 | 8/1960 | Rahn | 33—1 |
| 2,963,900 | 12/1960 | Kuebler | 33—1 X |
| 3,087,247 | 4/1963 | Busch | 33—1 |

FOREIGN PATENTS 902,895   1/1945   France.

OTHER REFERENCES

Moodz, J. C.: The Tool Engineer, vol. XXXV, No. 4, October 1955, pages 85–91.

LEONARD FORMAN, *Primary Examiner.*

W. D. MARTIN, *Assistant Examiner.*